June 13, 1933. J. C. YINGLING 1,914,189
HOOK GUARD
Filed April 16, 1932
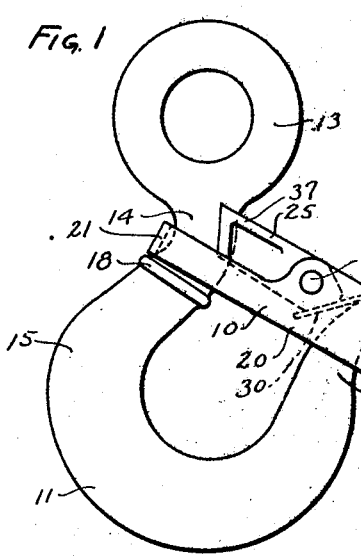
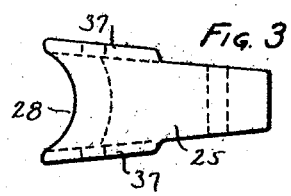
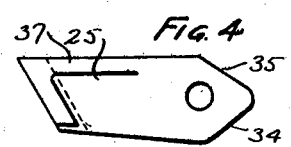
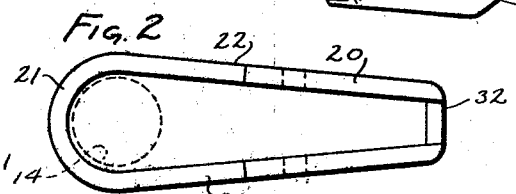
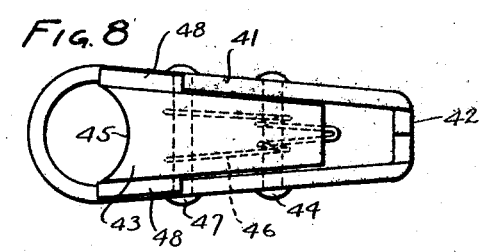
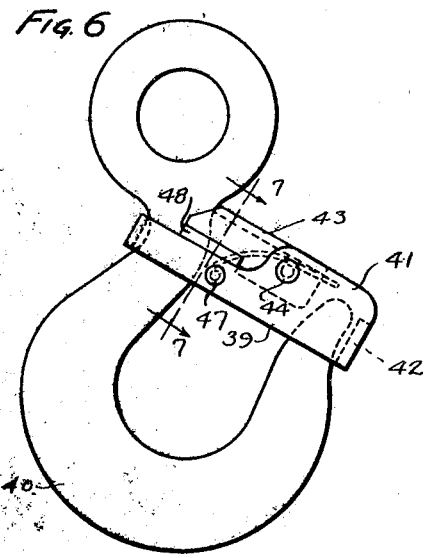
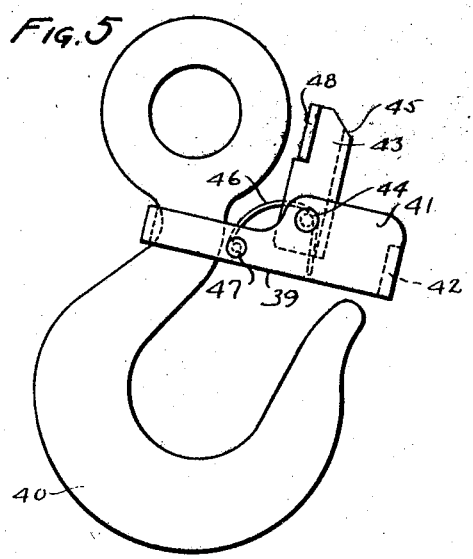
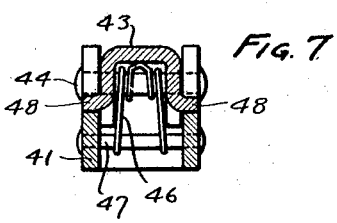
Inventor
John C Yingling
Maréchal & Noe
By
Attorney Patented June 13, 1933

1,914,189

UNITED STATES PATENT OFFICE

JOHN C. YINGLING, OF ST. MARYS, OHIO

HOOK GUARD

Application filed April 16, 1932. Serial No. 605,567.

This invention relates to hook guards and the like and particularly to safety guards adapted to be applied to hooks or similar supporting devices to prevent ropes, chains, or other elements engaged by the hooks from becoming accidently detached therefrom.

The principal object of the invention is the provision of the hook guard having a holding or locking means engageable with the neck of the hook and holding the guard in throat spanning position on the hook.

Another object of the invention is the provision of a hook guard of simple and cheap construction, having means of a dependable and reliable character engaging the hook at the throat portion thereof and serving to hold the guard in throat spanning position to prevent the accidental displacement or release of a suspended article.

Other objects and advantages of the invention will be apparent from the following description, the appended claims and the accompanying drawing, in which—

Fig. 1 is a side elevation of a hook having a hook guard embodying the present invention;

Fig. 2 is a detail view of the throat spanning body member;

Fig. 3 is a detail view of the holding or locking arm;

Fig. 4 is a side view of the locking arm;

Fig. 5 is a side elevation of a hook and guard of modified form;

Fig. 6 is a side elevation corresponding to Fig. 5 with the guard in throat spanning position;

Fig. 7 is a section on line 7—7 of Fig. 6; and

Fig. 8 is a top plan view of the guard shown in Figs. 5, 6 and 7.

The guard, which has been designated in Fig. 1 of the drawing by the numeral 10 is a throat spanning device adapted to extend across the throat of the hook 11 to prevent ropes, chains or other element engaged by the hook from becoming accidentally detached therefrom. The guard is held in throat spanning relationship with the hook against forces applied from within the hook, when mounted in position as shown in Fig. 1, although the arrangement is such that the guard may be readily released from a rather rigid position on the hook so that the free end of the guard may be moved up away from the hook point and then swung laterally so that the attached or suspended device carried by the hook may be readily released.

The hook 11 embodies the supporting eye 13 and the neck 14 which extends from the shank or supporting leg 15 of the hook. The eye of the hook may be arranged so that its passage extends either transversely or parallel to the load receiving opening in the hook, but as shown herein the passages are arranged in parallel relationship. The hook point 16 is spaced, of course, a suitable distance from the neck 14 to provide a throat through which a chain or rope may be passed. These parts are all of standard construction and the guard may, if desired, be used on a standard form hook, although a special form of hook is preferably used differing from standard construction in that it has a ring or protuberance 18 on its shank which is below the neck 14, and which holds the guard in engagement with the hook neck and prevents the guard from being readily removed or lost.

The guard 10, as herein shown, comprises a body member 20 which is adapted to span the throat of the hook. This body member is preferably made as a single piece from stamped or pressed metal such as steel or the like which is then bent to the form shown in Fig. 2. The end portion 21 of the body member embraces the hook neck 14, while the two sides 22 and 23 are spaced apart and extend across the throat of the hook, their end portions straddling the hook point. The portion of the body member 20 which extends around the neck of the hook is curved so as to conform generally to the neck shape but the curvature is sufficiently greater than that of the hook, as shown in Fig. 2, as to permit a freedom of movement of the body member so that it can be swung up away from the hook point and so that it can be turned to extend transversely away from the throat of the hook. The protuberance 18 on the hook prevents the neck embracing portion of the guard from dropping down or becoming disengaged from the hook.

Carried on the side portions 22 and 23 of the body member 20 is a holding or locking arm 25, pivotally supported by a pin 26 which extends through and is secured to the two opposite sides 22 and 23, thus not only serving to pivotally support the locking arm 25 but also rigidly interconnecting the spaced side portions of the guard together at a point a substantial distance away from the neck of the hook. The locking arm 25 as shown in Figs. 3 and 4 may be a cast metal block having a curved face 28 which is adapted to contact with the neck of the hook and which is preferably so formed as to conform to the shape of the hook neck when the parts are in the position as shown in Fig. 1. In this position the holding arm extends approximately parallel to the body member 20 and since the free end of the locking arm abuts against the hook neck the locking arm serves to hold the guard in a position to span the throat of the hook, holding the outer portion of the sides 22 and 23 in cooperative relation with the hook point, which they straddle, so that a suspended article cannot become freed from the hook.

The locking arm is held preferably in a yielding manner in the position shown in Fig. 1 by means of a spring 30 shown in the form of a spring blade or leaf having one end fixed by means of a rivet to the end 32 of the side portion 23. This end 32 is bent inwardly so as to extend across the space between the ends of the sides 22 and 23 and may be welded, if desired, to the end of the side 22. The spring 30 is flexed so that its free end cooperates with the flat sides 34 and 35 provided on the tail portion of the locking arm. In the position of the parts shown in Fig. 1 the spring extends along the lower surface 34 and yieldingly holds the locking arm in its holding position, holding the free end of the locking arm in engagement with the neck of the hook. When the locking arm is grasped by the fingers, the projecting sides 37 extending out laterally on the locking arm for this purpose, and the locking arm then pulled upwardly so as to be swung up about its pivot pin, the spring 30 will be flexed downwardly until the spring 30 cooperates with the surface 35, serving to hold the arm in an upright or released position. When the locking arm has been so moved, the guard may be readily pulled up away from the point of the hook and then swung laterally so as to permit the attachment or release of a suspended article.

The guard construction shown in Figs. 5, 6, 7 and 8 differs somewhat from the construction already described. As shown in Fig. 5 the guard 39 is adapted for use with an ordinary form of hook as shown at 40, means being provided on the guard to prevent the guard from being disengaged entirely from the hook as will presently be described. The guard 39 embodies a body member 41 formed preferably from a single piece of sheet metal bent around the neck of the hook and having inturned end portions 42 adjacent the hook point. The locking arm 43 as herein shown is also formed of sheet metal which is bent to a substantially inverted U-shape in cross-section as shown in Fig. 7, the downwardly turned sides of which are spaced apart a suitable distance so as to be received between the sides of the body portion 41. A pivot pin or rivet 44 extends through the sides of the body member and through the locking arm 43 and pivotally supports the locking arm a suitable distance away from the neck of the hook so that the neck engaging end 45 of the locking arm can be brought down into close contact with the neck of the hook and the guard will then be held so that it spans the throat of the hook. A wire spring 46 is carried by a rivet 47 at one end, its free end extending along the under side of the channel shaped locking arm and serving to normally hold the locking arm yielding against the neck of the hook in the position of the parts shown in Fig. 6. The spring is preferably looped around the rivet 44 between its attached and free ends.

In order to limit the extent to which the locking arm can be moved down, the sides of the locking arm are provided with outwardly bent extensions 48 which may rest on the upper side of the hook embracing portion of the body member as shown in Fig. 7. The sides of the locking arm where they project upwardly away from the outbent extensions 48, may be readily grasped by the fingers in order to move the locking arm to a released position so that the guard can be then tilted up away from the point of the hook.

It will be understood that the guard is so associated with the hook that it cannot become lost as the rivet or pin 47 is positioned closely adjacent to, but spaced a little distance from the hook neck. The distance from this pin to the curved end of the body member, while sufficiently great to permit the guard to be moved about the hook neck, is not great enough to permit the guard to be moved down over the thicker portions of the hook below the neck. The sheet metal parts are preferably assembled before being applied to the hook, the pin or rivet 47 being added after the body member is slipped on the hook to prevent the guard from being subsequently lost.

As will be apparent from Fig. 6, the inturned end 42 of the body member is spaced preferably a little distance away from the hook point so that when the guard is held in throat spanning position by the locking arm and its associated spring, the hook point will not quite touch the end 42. This gives an indication of unusual strains on the hook with which the guard is associated, because if the hook point should be bent downwardly under excessive loads, the hook point will then bear directly against the end of the body member and thus give an indication of the hook deformation and serve as a warning that failure of the hook is possible.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A guard of the character described adapted for cooperation with a hook having an enlarged supporting eye comprising a throat spanning body member having a portion adapted to loosely engage a definite point on the supporting leg of the hook just below the hook eye, and a portion cooperating with the hook point and adapted to be rotated away from the hook point while said first portion is in engagement with said definite point on the supporting leg, and holding means pivoted to said body member for movement about an axis spaced a considerable distance from the first named portion and having a free end adapted to be moved into engagement with the supporting leg of the hook to maintain second named portion in cooperative relation with the hook point.

2. A guard of the character described adapted for cooperation with a hook having an enlarged supporting eye just above the hook throat comprising a throat spanning body member having a portion adapted to loosely and rotatably engage the supporting leg of the hook, and a portion cooperating with the hook point, holding means pivoted to said body member for movement about an axis spaced a considerable distance from the first named portion and having a free end adapted to be moved into engagement with the supporting leg of the hook to maintain said second named portion in cooperative relation with the hook point, and means for yieldingly maintaining said holding means in operative position.

3. A guard of the character described adapted for cooperation with a hook having an enlarged supporting eye just above the hook throat comprising a throat spanning body member having a portion embracing the neck of the hook and a second portion adapted to straddle the hook point, and a holding arm pivoted to said body member and having a free end adapted for contact with the neck of the hook to hold said body member in operative position across the throat of the hook.

4. A guard of the character described adapted for cooperation with a hook having an enlarged supporting eye just above the hook throat comprising a throat spanning body member having a portion embracing the neck of the hook and a second portion adapted to straddle the hook point, a holding arm pivoted to said body member and having a free end adapted for contact with the neck of the hook to hold said body member in operative position across the throat of the hook, and spring means acting to maintain the end of said arm in engagement with the neck of the hook.

5. A guard of the character described for cooperation with a hook having an enlarged supporting eye just above the hook-throat comprising a body member having spaced flat body portions adapted to span the throat of the hook and embrace the neck of the hook, a holding arm pivoted on said flat body portions and having a free end movable into engagement with the neck of the hook, and a spring cooperating with a portion of said holding arm for maintaining the free end of said arm in engagement with the hook neck.

6. A guard adapted for cooperation with a hook having an enlarged supporting eye just above the hook throat comprising a throat spanning body member having spaced apart throat spanning sides and a hook neck embracing end all formed from a single piece of sheet metal, and means engageable with the neck of the hook and attached to said body member for holding said body member in fixed throat spanning position on said hook.

7. A guard adapted for cooperation with a hook having an enlarged supporting eye just above the hook throat comprising a body member loosely engaging the neck of the hook and having spaced sides spanning the throat of the hook, a holding arm pivoted on said sides and having a free end engageable with the neck of the hook, and a spring on said body member cooperating with said arm for holding the arm against the hook neck.

8. A guard adapted for cooperation with a hook having a neck of smaller size than those portions of the hook on opposite sides of the neck comprising a body member having spaced sides spanning the throat of the hook, said body member embracing the neck of the hook and cooperating with the hook point, and means engageable with the neck of the hook for holding said body member in throat spanning position, and a pin pivotally supporting said means and also serving to attach opposite sides of said body member securely together.

9. In combination, a hook having a neck and a shank portion extending from said neck, the shank portion and the portion of the hook above the neck being of substantially larger cross section than the neck, and a guard member spanning the throat of the hook and having spaced side portions extending around the neck of the hook, a locking arm pivoted to said side portions and engageable with the neck of the hook, and means secured to said side portions closely adjacent to but spaced a little distance from the hook neck preventing separation of the guard member from the hook.

10. In combination, a hook having a supporting eye, a neck of comparatively small cross-sectional extent and a shank portion extending from said neck, and a guard member spanning the throat of the hook and having spaced side portions extending around the neck of the hook, a locking arm pivoted to said side portions and engageable with the neck of the hook, spring means between said side portions engaging said arm for holding the arm in engagement with the neck of the hook, and means secured to said side portions closely adjacent to but spaced a little distance from the hook neck for holding the spring and also preventing separation of the guard member from the hook.

11. A guard adapted for cooperation with a hook provided with an enlarged supporting eye, comprising a body member loosely engaging the neck of the hook and having spaced sides spanning the throat of the hook, a sheet metal holding arm of substantially U cross-sectional shape, opposite legs of the U being positioned closely adjacent to and pivoted on said sides, and having a free end engageable with the neck of the hook, and means cooperating with said arm for holding the arm against the hook neck.

In testimony whereof I hereto affix my signature.

JOHN C. YINGLING.